US008619401B2

(12) United States Patent
Singnurkar

(10) Patent No.: US 8,619,401 B2
(45) Date of Patent: Dec. 31, 2013

(54) CURRENT SOURCE REGULATOR

(75) Inventor: Pramod Singnurkar, Graz (AT)

(73) Assignee: AMS AG, Unterpremstaetten (AT)

( * ) Notice: Subject to any disclaimer, the term of this patent is extended or adjusted under 35 U.S.C. 154(b) by 391 days.

(21) Appl. No.: 12/819,441

(22) Filed: Jun. 21, 2010

(65) Prior Publication Data

US 2011/0316499 A1 Dec. 29, 2011

(30) Foreign Application Priority Data

Jun. 22, 2009 (EP) .................................... 09008161

(51) Int. Cl.

| | |
|---|---|
| ***H02H 9/02*** | (2006.01) |
| ***G05F 1/00*** | (2006.01) |
| ***G05F 3/08*** | (2006.01) |
| ***G05F 3/16*** | (2006.01) |

(52) U.S. Cl.
USPC ........ 361/93.1; 361/93.7; 361/93.9; 323/268; 323/312

(58) Field of Classification Search
USPC ......... 323/312, 313, 314, 315, 316, 280, 286; 361/93.1, 93.7, 93.9
See application file for complete search history.

(56) References Cited

U.S. PATENT DOCUMENTS

| | | | | |
|---|---|---|---|---|
| 4,207,475 | A | 6/1980 | Nercessian | |
| 5,479,090 | A | 12/1995 | Schultz | |
| 5,561,391 | A * | 10/1996 | Wellnitz et al. | 327/309 |
| 5,945,818 | A * | 8/1999 | Edwards | 323/273 |
| 6,188,211 | B1 * | 2/2001 | Rincon-Mora et al. | 323/280 |
| 6,281,667 | B1 * | 8/2001 | Matsumura | 323/274 |
| 6,586,917 | B1 | 7/2003 | Smith | |
| 6,653,891 | B1 | 11/2003 | Hazucha | |
| 6,801,419 | B2 * | 10/2004 | Fukui | 361/93.1 |
| 7,262,586 | B1 | 8/2007 | Gradinariu | |
| 7,339,775 | B2 * | 3/2008 | Kimura | 361/93.1 |
| 2005/0007198 | A1 * | 1/2005 | Versteegen | 330/264 |
| 2007/0132441 | A1 | 6/2007 | Hauser | |
| 2009/0273874 | A1 * | 11/2009 | Yen | 361/93.9 |
| 2010/0090664 | A1 * | 4/2010 | Jian | 323/277 |

* cited by examiner

*Primary Examiner* — Jue Zhang
*Assistant Examiner* — Trinh Dang
(74) *Attorney, Agent, or Firm* — McDermott Will & Emery LLP

(57) ABSTRACT

A current source regulator for controlling an output device (Mp) of current source, the output device (Mp) providing an output current (Isrc) to a load. The current source regulator comprises a first feedback loop (1) and second feedback loop (2). The first feedback loop (1) includes a first sensing path to provide a first sensing signal (Is1) for comparison with a first reference to generate a first control signal. The second feedback loop (2) comprises a second sensing path to provide a second sensing signal (Is3, Is3') for comparison with a second reference (Ib5) to generate a charging current signal (Icharge). The charging current signal (Icharge) is applied to the control signal during a transient state of the current source regulator.

16 Claims, 7 Drawing Sheets

CURRENT SOURCE REGULATOR

RELATED APPLICATIONS

This application claims the priority of European application no. 09008161.3 filed Jun. 22, 2009, the entire content of which is hereby incorporated by reference.

FIELD OF THE INVENTION

The present invention is related to a current source regulator for controlling an output device of a current source.

BACKGROUND OF THE INVENTION

Current sources and current source regulators are often used in mobile communication devices to provide a specific regulated current to several circuits and devices connected thereto. For example, regulators can be found in mobile communication devices, PDAs, several consumer devices and/or laptops and computers. In addition to a preferably stable and regulated output current, irrespectively of impedance changes of devices connected to an output of the regulated current source, the activation and deactivation of current source regulators become increasingly important.

FIG. 7 illustrates a known current source regulator having a main power transistor Mp whose output current is regulated using sensing transistor Ms1. A load LOAD connected to the output of power transistor Mp causes a voltage drop Vied. This voltage drop is detected and provided to a voltage equalizing network comprising transistors M2, M9, M6, M7 and M10.

A negative feedback loop regulates sensing current Is1 through sensing transistor Ms1 to a reference current given by Ib2−Ib1. An error is the difference between sensing current Is1 and the current Ib2. The error current is passed through a bias transistor M4 of the negative feedback loop. The error current is then compared with the current Ib1 to generate the control voltage signal Vg to drive the gate of sensing transistor Ms1 as well as of power transistor Mp. As a result, the negative feedback loop provides a stable output current Isrc for the load connected to the power transistor.

The maximum source gate voltage Vsg across power transistor Mp is given by the minimum control voltage Vg(min). This minimum control voltage Vg(min) is given by a sum of the saturation voltages of transistors M4 and M8. Vg(min) is given by the equation Vg(min)=Vsat(M4)+Vsat(M8). Consequently, the size of power transistor Mp depends on the minimum control voltage Vg(min).

If the saturation voltage Vsat of transistor M8 is reduced, the size of that transistor may increase correspondingly. Since transistor M8 supplies the reference current for the negative feedback loop, it should have a large length and at the same time large width to reduce the saturation voltage Vsat(M8). As an overall result, the area of the source regulator may increase as well.

In addition to these drawbacks a very high peak current may occur during activation of the regulator and sensing transistor Ms1 as well as of power transistor Mp.

SUMMARY OF THE INVENTION

One object of the present invention is to provide an improved current source regulator as well as a respective current source with reduced chip size area.

The present invention has found a new regulation method and a new current source regulator. One proposed regulator has a reduced power transistor size by more than 12% compared to known implementations. One proposed new regulation uses the available voltage as a supply for the power transistor and the sensing transistor. Further, the available supply voltage can be completely used for the source gate voltage of the power transistor and still provides the required reference current.

In addition, one proposed current source regulator is able to separately control the activation and deactivation of the power transistor. This is achieved by controlling startup of the current source regulator through a feedback. Hence, a very fast activation or turn on of the current source regulator and a current source coupled thereto is possible. If, particularly PWM pulses are used, such very fast activation may be advantageous compared over other concepts. At the same time peak overshoots causing damage in downstream-connected devices can be significantly reduced or even prevented.

In an embodiment, a current source regulator for controlling an output device of a current source, said output device providing an output current to a load connected thereto in response to a common control signal. The regulator comprises a first feedback loop and a second feedback loop. The first feedback loop comprises a first sensing path to provide a first sensing signal for comparing the first sensing signal with a first reference. In response to such comparison, the first feedback loop generates a first control signal.

The second feedback loop comprises a second sensing path to provide a second sensing signal based on the common control signal. The second sensing signal is compared with a second reference to generate a charging current signal. The charging current signal acts as a second control signal. The charging current signal is being applied to the power transistor during a transient state of the current source regulator.

In an embodiment of the present invention, the current source regulator comprises two feedback loops wherein one of the feedback loops generates a charging current signal during startup or a transient state of the current source regulator. If the current source regulator reaches a steady state, the charging current signal may be deactivated and a common control signal provided to the output device is generated only by the first feedback loop.

The first feedback loop can be activated or deactivated during the transient state. If the first feedback loop is not or only partly activated, the common control signal may comprise only the charging current signal. Alternately the common control signal may comprise the charging current signal and the first control signal provided by the first feedback loop.

The additional second feedback loop may be used only during a transient state of the current source regulator for instance during startup of the current source regulator until it reaches a steady state.

The second feedback loop provides the charging current signal to charge the source gate capacitance of the sensing transistors of the first and second feedback loop as well as of the power transistor. As a result, the power transistor reaches a conductive state during the activation process much faster than it would reach the respective conductive state if being charged only with a first control signal provided by the first feedback loop.

In an embodiment, the output device of the current source regulator is controlled by a common control signal. During a transient state of the current source regulator, the common control signal comprises an optional first portion, the optional first portion being the first control signal, and the common control signal always includes a second portion, the second portion being the charging current signal. In a steady state of the current source regulator, the output device is controlled by a common control signal, said control signal comprising the first control signal provided by the first feedback loop.

In an embodiment the first feedback loop comprises a level shifter which is arranged between a comparator of the first feedback loop and a node at which the charging current signal is applicable. The level shifter may be implemented by a diode. To use a diode as a level shifter causes the voltage at the comparator output to be higher than a voltage at the node at which the charging current signal is applicable. In an embodiment, a voltage at the output of the comparator is higher during operation than a voltage at the node. A diode also blocks an undesired fast startup current and therefore reduces a peak overshoot during a startup phase of the regulator.

In operation of the current source regulator, the comparator may provide an output signal in response to a comparison of the sensing signal provided by the first sensing path and the first reference. This output signal is level shifted by the respective level shifter and applied to the output device as the first control signal. In dependence on the operating state of the current source regulator, a charging current signal is applied to the level shifted first control signal.

In another embodiment the current source regulator comprises a voltage equalizing network having a current mirror. The current mirror and more particularly current mirror transistors are arranged in the first and second current sensing path. The current mirror may be also coupled to the output of the power transistor to equalize a voltage and a first and second current sensing path to an output load voltage.

In a further embodiment the first and/or second sensing path comprises a sensing transistor. A gate of the sensing transistor is being coupled to a common output of the first and second feedback loop, at which the common control signal is applied. Consequently, the gate of the sensing transistor is also coupled to the gate of the power transistor as well as to the node, at which the charging current signal is applicable.

In other words, the sensing transistors of the first and sensing path are controlled by the common control signal, which may comprise at least the charging current signal during a transient state of the source regulator and the first current signal during steady state of the current source regulator.

In this respect, the first and/or second sensing signal may be a current sensing signal. In an embodiment, the signal provided by the first sensing path may be a current sensing signal, which is compared in the first feedback loop with a reference current to provide a signal, which is level shifted to generate the first control signal. The first control signal may be a voltage signal.

The power transistor is supplied by a supply voltage provided by a supply terminal, which is also connected to the first and second sensing path.

In yet another embodiment, the first feedback loop comprises a current path having a first and second current source connected in series and a first and second node in between. While the first node is coupled to the first sensing path, the second node is coupled to the output device. Consequently, the first control signal is provided at the second node. In an embodiment, a bias device may be arranged between the first and second node of the first feedback loop. The bias device may preferably comprise a transistor.

In a further embodiment, a third current source may be coupled to the output device and to the common node at which a common control signal is provided. In an embodiment, current through the first current sensing transistor may be regulated to the difference between the second current source and the first current source minus said third current source.

Preferably, the third current source may provide a current smaller than the second current source. In such embodiment, an error in the common control voltage generated by the third current source may be given by the ratio between the current of the third current source divided by the current of the second current source.

The third current source may be used to charge the gate source capacitance of the sensing transistors and the power transistors as long as the first current source is smaller than the second current source, and a diode serving as a level shifter is in reverse bias.

DETAILED DESCRIPTION OF THE DRAWINGS

In the following detailed description, several aspects of the present invention are explained in greater detail with reference to the accompanying drawings. Some references are used to represent current sources as well as currents provided by those respective current sources.

Features shown in the figures are not restricted to the respective embodiments, but can be combined in different ways by a person skilled in the art. The switches and transistors for the current source and the current source regulator as well as for other sub-circuits according to the present invention are implemented by the field-effect transistors for illustration purposes only. Other devices achieving the same functional results can be used as well. Particularly, the switches comparators current mirrors and current sources shown in the embodiments can be implemented in different ways.

Some sub-circuits or elements may be represented enlarged with respect to other elements. Such enlargement is for illustration purposes and does not reflect differences in real size or geometry when implementing those elements. The circuits and sub-circuits as well as the elements shown herein can be implemented in a single semiconductor body as an integrated circuit or as separated devices and circuits using integrated as well as discrete components.

Figure 1:
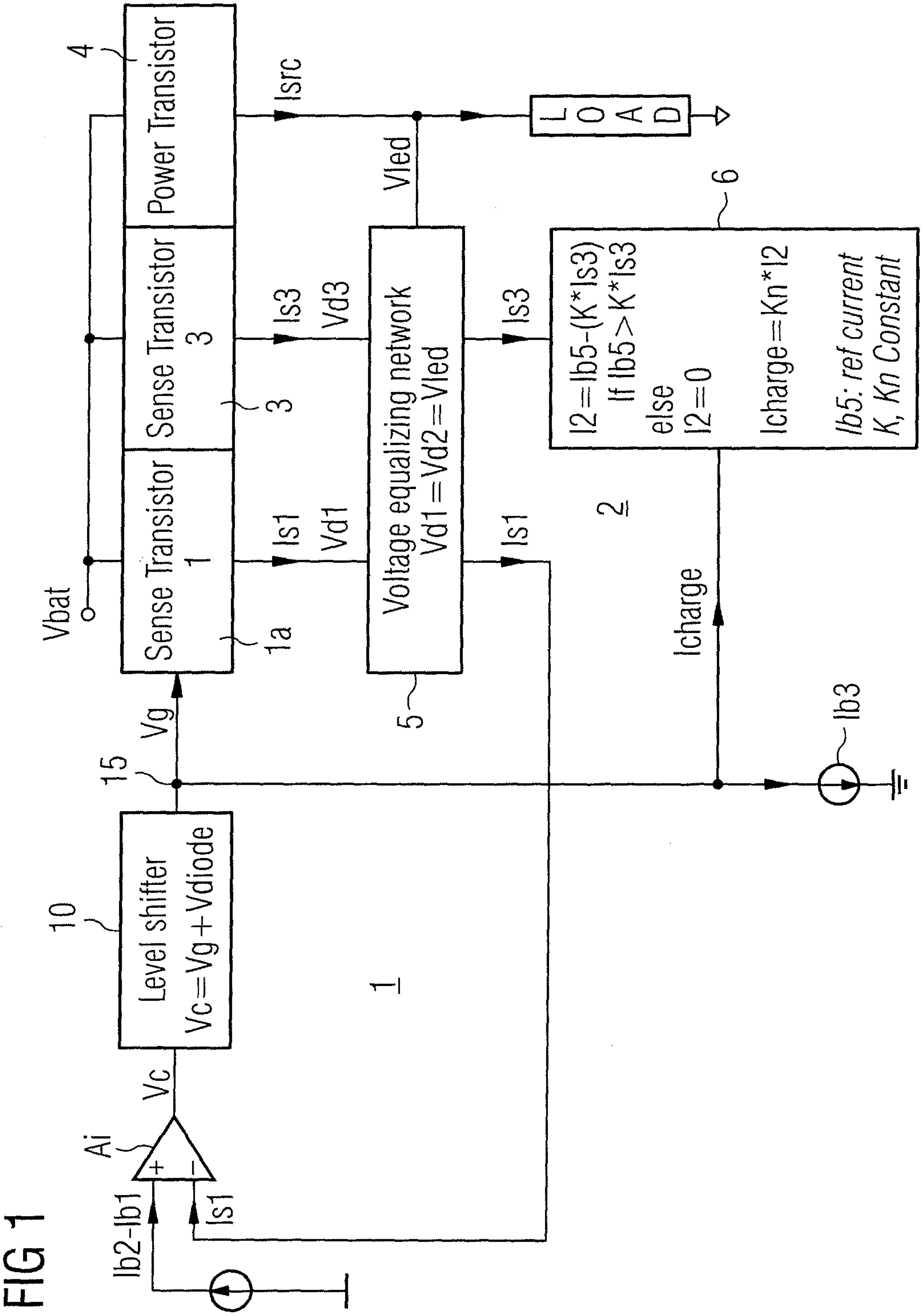
FIG. 1 shows a first embodiment of the present invention.

FIG. 1 illustrates an embodiment of the present invention which uses an additional feedback loop to generate a charging current signal for compensating the gate source capacitance of the sensing transistors and the power transistor in the respective signal path.

The current source regulator comprises a power transistor 4 which is coupled to a supply potential terminal Vbat. The power transistor is controlled by a common control signal Vg and provides a respective output current Isrc in response thereto. An external load LOAD is connected to an output of the power transistor Mp such that at a node between the load and transistor Mp an output voltage Vled can be derived.

Output voltage Vled may vary depending on the impedance and the resistance of external load LOAD connected thereto. Preferably, the maximum output voltage Vled(max) shall be similar to the supply voltage applied to the supply terminal Vbat.

The current source regulator further comprises a first feedback loop 1 including a first sensing path with sense transistor 1*a*, a portion of a voltage equalizing network 5, a comparator Ai and a level shifter 10. The output of level shifter 10 is connected to node 15. In addition, the current source regulator comprises a second feedback loop 2 including a second sensing path with sensing transistor 3, a portion of the voltage equalizing network 5 and comparator assembly 6. An output of comparator assembly 6 is coupled to node 15 to provide a current charging Icharge in response to a comparison in comparator assembly 6.

Node 15 is connected to control terminals of sense transistors 1 and 3 as well as to power transistor 4. A further current source Ib3 provides a small bias current for the regulation of the common control signal Vg at node 15.

Comparator assembly 6 includes a reference current source providing reference current Ib5. If reference current Ib5 is K times greater than current Is3 provided by the second sensing path including sense transistor 3, the respective current charge signal Icharge is given by a Kn times the difference between reference current Ib5 and the sensing current Is3. Accordingly, $$I\text{charge}=Kn*(Ib5-(K*Is3)),\ \text{if } Ib5>K*Is3$$

$$I\text{charge}=0,\ \text{if } Ib5<K*Is3$$

wherein K and Kn are constants. The relationship is also indicated in FIG. 1.

The first sensing path including sensing transistor 1*a* senses the current of power transistor 4 and provides the first sensing current signal Is1. First current sensing signal Is1 is equalized in equalizing network 5 and applied to a non-inverting input of comparator Ai.

At the same time, the second feedback loop including the second sensing path with sensing transistor 3 senses the current of power transistor to Is3. Current sensing signal Is3 is applied to the comparator assembly 6 of the second feedback loop 2 to provide the charging current signal (charge depending on the above mentioned relationship.

Consequently, common control signal Vg may comprise a first portion derived by the first feedback loop 1, bias current Ib3 and—if existing—charging current Icharge as a second portion. Common control signal is therefore depending on the operation state of the current source regulator. In steady state, common control signal Vg may comprise only the first control signal and the Ib3. During a transient state, the common control signal may comprise the bias current Ib3 provided by current source Ib3 and the charging current signal Icharge. It may additionally also comprise the first control signal provided by feedback loop 1.

The reference current for comparator Ai of first feedback loop 1 comprises a current which is given by the difference between current sources Ib2 and Ib1 as indicated in FIG. 1. If these current sources generate the respective output currents using transistors being operated in their respective saturated regions, output voltage Vc of comparator Ai is greater than 0. Due to level shifter 10, voltage Vc will be higher than voltage Vg at node 15. Since reference current Ib3 is smaller it requires only a small voltage at node 15, while reference current source Ib2 provides a much higher current. Consequently, voltage Vc will be higher as well.

This means that even if common control voltage Vg=0 (or close to it due to bias signal Ib3), output voltage Vc is held to the internally generated voltage Vdiode of level shifter 10. Still, if Icharge as well as the common control voltage Vg equals 0, the current provided by the third current source Ib3 is very small and may also a drop to 0 in this case. As a result, only a small error may be introduced in the output current Isrc of power transistor 4.

The current source regulator according to the present invention comprises at least a first operating state called steady state and a second operating state called transient state. During the second operating state, which normally occurs during startup or activation procedure, charging signal Icharge of second feedback loop 2 is used to charge the gate-source capacitance of sensing transistors 1*a*, 3 and power transistor 4. In addition, the third current source Ib3 may bias the diode. Current sensing Icharge is much larger than the current provided by third current source Ib3. In contrast thereto, the current provided by current source Ib3 is larger than the charging current Icharge in steady state, in which the gate-source capacitance of the sensing transistors are charged completely.

Figure 2:
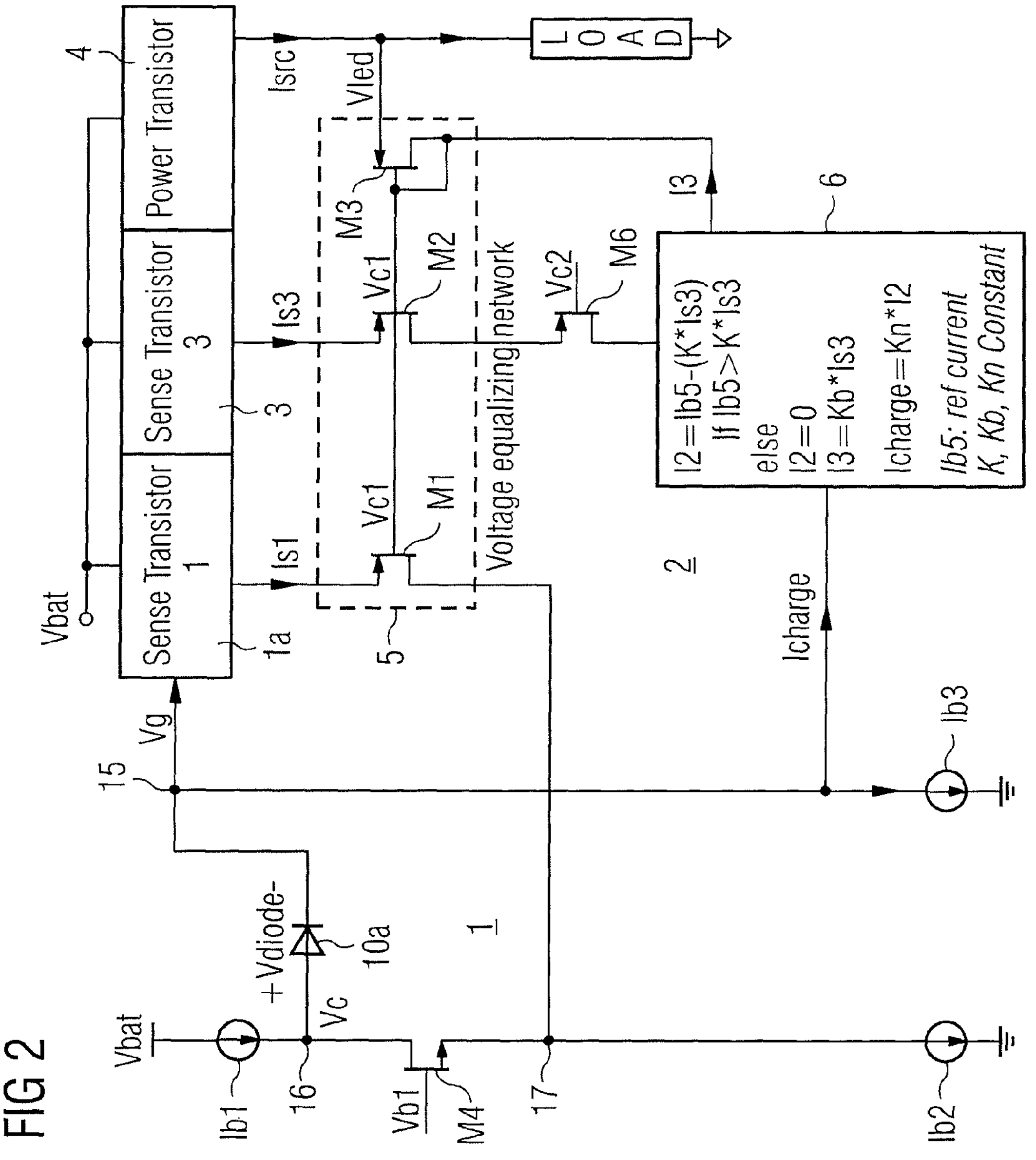
FIG. 2 shows a second embodiment of the present invention.

FIG. 2 illustrates a more detailed view of an embodiment according to the present invention including an embodiment of comparator Ai and the voltage equalizing network 5. Voltage equalizing network 5 comprises a current mirror including transistors M1, M2 and current mirror transistor M3. While one terminal of current mirror transistor M3 is connected to the node between output terminal of power transistor 4 and load LOAD, the other terminal is coupled to its respective gate and to comparator assembly 6 of second feedback loop 2. Current I3 is mirrored using a voltage Vc1 into transistors M2 and M1, respectively. Transistor M1 is powered of the first sensing path including sensing transistor 1*a* of the first feedback loop 1. Transistor M2 is arranged between bias transistor M6 and the second sensing transistor 3 in second sensing path 2. Transistor M6 is coupled to comparator assembly 6.

First feedback loop 1 further comprises reference current source Ib1 connected in series with bias transistor M4 and second current source Ib2. Second current source Ib2 is capable of providing a current much greater than current Ib3. For instance, second current source Ib2 provides a current roughly sixty times greater than the current provided by current source Ib3. Node 16 between bias transistor M4 and first current source Ib1 is coupled to diode 10*a* serving as level shifter. The other terminal of diode 10*a* is connected to common output node 15, thereby providing control signal Vg. In addition, current source Ib2 provides a current roughly ten times the current provided by current source Ib1.

During startup procedure and a transient state of the regulator according to the present invention, second current source Ib2 is not used due to reversed biased diode 10*a*. Consequently, the gate-source capacitance of sense transistors 1*a*, 3 and power transistor 4 are charged by the charging signal Icharge and bias current Ib3 provided by the respective third current source Ib3. At the same time, first sense transistor 1*a* provides sense signal Is1 which is given by the current of second current source Ib2 less the current differences between current source Ib1 and Ib3. The current sensing signal Is1 is therefore given by:

$$Is1=Ib2-(Ib1-Ib3)$$

where Ib2, Ib1 and Ib3 are the respective currents provided by the current sources having the same reference. During startup and the transient state, comparator assembly 6 of second feedback loop 2 determines an internally generated current I2 given by $$I2=Ib5-(K*Is32)$$

wherein Ib5 is a reference current and Is3 is the second sensing signal. If reference current $$Ib5>K*Is3, \text{ wherein } K \text{ is a constant}$$

the resulting current I2 is positive. Comparator assembly 6 generates charging current signal Icharge given by $$I\text{charge}=Kn*I2=Kn*(Ib5-(K*Is3))$$

wherein Kn and K are proportional constants. Further, comparator assembly 6 provides current I3 to voltage equalizing network 5 given by Kb*Is3, wherein Kb is a proportional constant.

If the reference current $$Ib5<K*Is3,$$

due to level shifter 10*a*, voltage Vc at node 16 will be higher than voltage Vg at node 15. Since reference current Ib3 is smaller it requires only a small voltage at node 15, while reference current source Ib2 provides a much higher current. Consequently, voltage Vc will be higher as well. During startup, the charging current Icharge decreases linearly with increase of Is3 until it becomes zero. As Is3 reaches steady state value, the source-gate capacitance is slowly charging with current Icharge.

Figure 3:
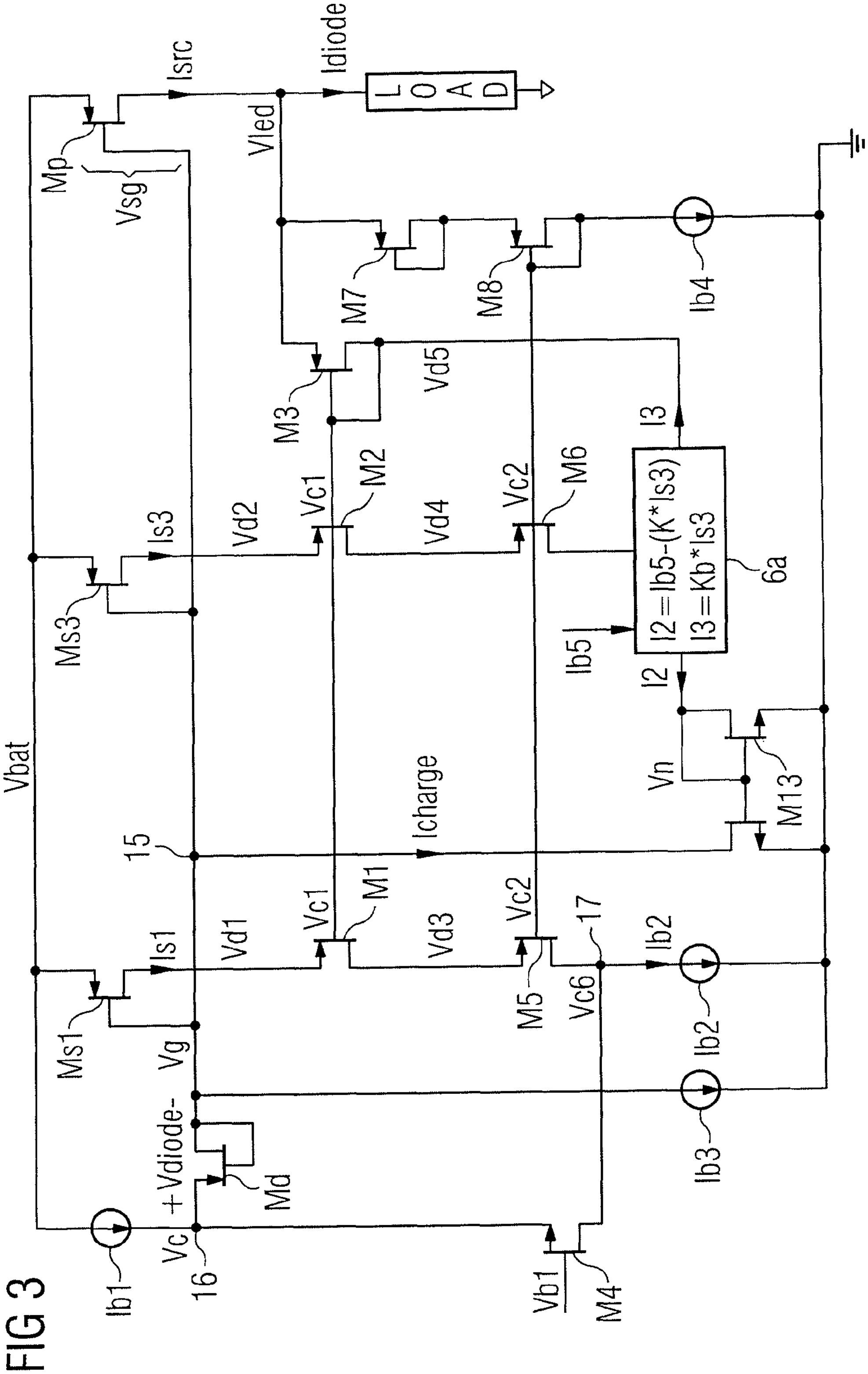
FIG. 3 shows a more detailed view of the second embodiment.

FIG. 3 shows a further embodiment of the present invention. In this embodiment, a further current mirror with transistors M5 and M6 is arranged in the first and second sensing path, respectively. Current mirror transistor M8 is coupled to current source Ib4 and to diode M7 to provide an additional diode current Idiode. Transistor M6, with its gate coupled to current mirror transistor M8 thereby applying voltage Vc2 to its respective gate is arranged between comparator 6*a* and transistor M2 of the voltage equalizing network. Transistor M5 is arranged between node 17 and M1 of voltage equalizing network 5. The current through transistors M5 and M1 equals Is1, the sensing current signal provided by sensing transistor Ms1 of the first sensing path.

Comparator assembly 6 with element 6*a* receives reference current Ib4 and provides first output current I2 to current mirror transistor M13. Output current I2 equals the reference current Ib5 less K*Is3, wherein Is3 is the current sensing signal of the second sensing transistor Ms3. The voltage equalizing network with its current mirror transistor M3 receives current I3 by element 6*a* given by Kb*Is3, wherein Kb is a proportional constant.

The current provided by third current source Ib3 is used as bias current for diode connected transistor Md. The voltage Vc at node 16 corresponding to the output voltage of comparator Ai in the first feedback loop is equal to the common control voltage Vg+Vdiode. The current source Ib2 comprises a bias transistor being arranged between node 17 and the ground terminal. Voltage Vdiode across diode connected transistor Md is greater than the situation voltages of bias transistor M4 and bias transistor within second current source Ib2. Accordingly:

$$V\text{diode}>Vsat(M4)+Vsat(M10).$$

If the common control voltage equals 0, voltage Vc at node 16 still holds the voltage across diode connected transistor Md, which is sufficient for transistors M4 and the transistor within current source Ib2 to be in saturation. The minimum common control voltage Vg therefore is almost 0. As a result, the source-gate voltages Vsg of transistor Ms1 and transistor Mp is higher than the respective source-gate voltages of the prior art. A higher source-gate voltage can be used to reduce the size of power transistor Mp. Further, the size of the bias transistor within current source Ib2 is not required to have the same width and length as requested in the prior art.

Figure 4:
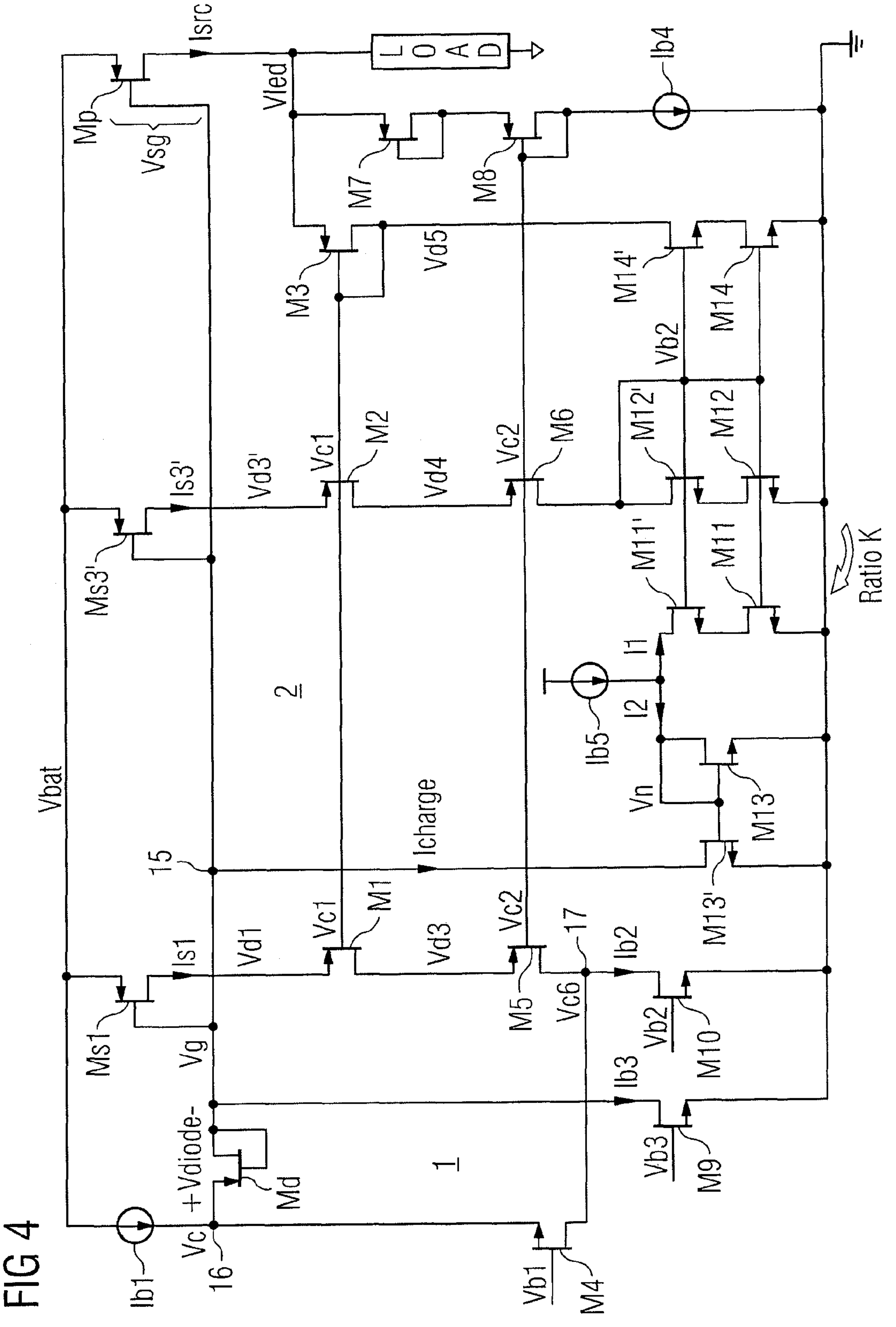
FIG. 4 shows yet another embodiment of the present invention.

FIG. 4 shows a detailed embodiment of a current source regulator according to the present invention. Element 6*a* comprises current mirror including transistors M11, M11', M12, M12', M13, M14 and M14'. Transistors M12 and M12' are arranged in series between transistor M6 and the ground terminal. A node between M6 and transistor M12' is coupled to the respective gates of current mirror transistors M12 and M12'.

Further, transistor M3 of the voltage equalizing network is connected with one terminal to the output node of the current source regulator and with the other terminal to transistors M14 and M14' arranged between transistor M3 and ground terminal. Transistors M14' and M14 are connected with their respective gates to current mirror transistors M12' and M12, respectively. Further, transistors M11 and M11' are connected in series and coupled with their respective gates to the respective gates of current mirror transistors M12' and M12. The different geometric size between current mirror transistors M12, M12' and transistors M11, M11' defines the transfer ratio K, which is used in the above-mentioned equation as a proportional constant. Ratio K is given by the W/L ratio of transistors M11 to M12. Transistors M11, M11' and M13 are supplied by reference current source Ib5 providing the same reference current.

Reference current source Ib5 is also coupled to the gate of transistor M13 which mirrors the current I2 for transistor M13'.

In the embodiment, transistor Mp is a power transistor and matched with sensing transistor Ms1 and Ms3' of the first and second sensing path.

Sensing current Is1 is regulated to be equal to the current Ib2−(Ib1−Ib3), wherein Ib1, Ib3 and Ib2 are other currents provided by the respective current sources. If the minimum common control voltage Vg equals almost 0, the reference current error is given only by the current provided by current source Ib3. Consequently, the current provided by current source Ib3 should be as small as possible so this current maintains only a small error. Still, this error occurs only if the power transistor Mp is near situation due to the matching.

During a transient state of the current source regulator, for instance during a startup procedure, charging signal Icharge is generated with the illustrated feedback transistor arrangement.

Particularly, current Is3' generated by transistor Ms3' of second feedback loop 2 is mirrored in transistors M12 and M12' to transistors M11 and M11' with ratio K to generate current I1. Still, reference current source Ib5 provides currents I2 and I1. During a startup procedure, the second sensing current Is3' times the transfer ratio K (Is3'*K) does not exceed reference current Ib5. Consequently, a current I2 flows through transistor M13, and voltage Vn across current mirror transistor M13 mirrors the current to transistor M13' to generate charging current signal (charge. If the current source regulator reaches a steady state, the second sensing current signal Is3' times the ratio K exceeds the reference current provided by current source Ib5.

Of course, the steady state value of I1 flowing through transistors M11, and M11' may not exceed the reference current of source Ib5. Accordingly, as soon as second current sensing signal Is3' times the ratio K exceed reference current Ib5, voltage Vn decreases. Accordingly, charging current signal Icharge decreases as well as soon as voltage Vn drops below the threshold value of current mirror transistor M13.

In other words, charging current signal Icharge may be greater than 0, if current I1 is smaller than the reference current Ib5 and equals 0 for I1 greater than reference current Ib5. Current charging signal Icharge exists therefore only for a short duration during startup proceedings and is used to charge the source-gate capacitance of transistors Ms1, Ms3' and power transistor Mp. The charging current signal is also linearly proportional to the error between the reference current of current source Ib5 and current I1. This feature provides a very fast startup of power transistor Mp. If current I1 exceeds current of current source Ib5, the current of current source Ib3 still provides a charging current for the gate capacitance of sensing transistors Ms1 and Ms3 since the diode is still reversed bias.

First current sensing signal Is1 is regulated to a steady state value of current Ib2−(Ib1−Ib3) wherein Ib1, Ib2 and Ib3 represent the respective currents provided by the current sources having the same references. Of course, the diode voltage Vdiode must be smaller than the threshold voltage of the first sensing transistor Ms1.

With the current source regulator according to the present invention, the startup time until the current source regulator provides a regulation for power transistor Mp is significantly increased. In addition, the source-gate voltage across the power transistor almost reaches the supply voltage provided at supply terminal Vbat. The current through the load is also regulated to the almost maximum value.

Figure 5:
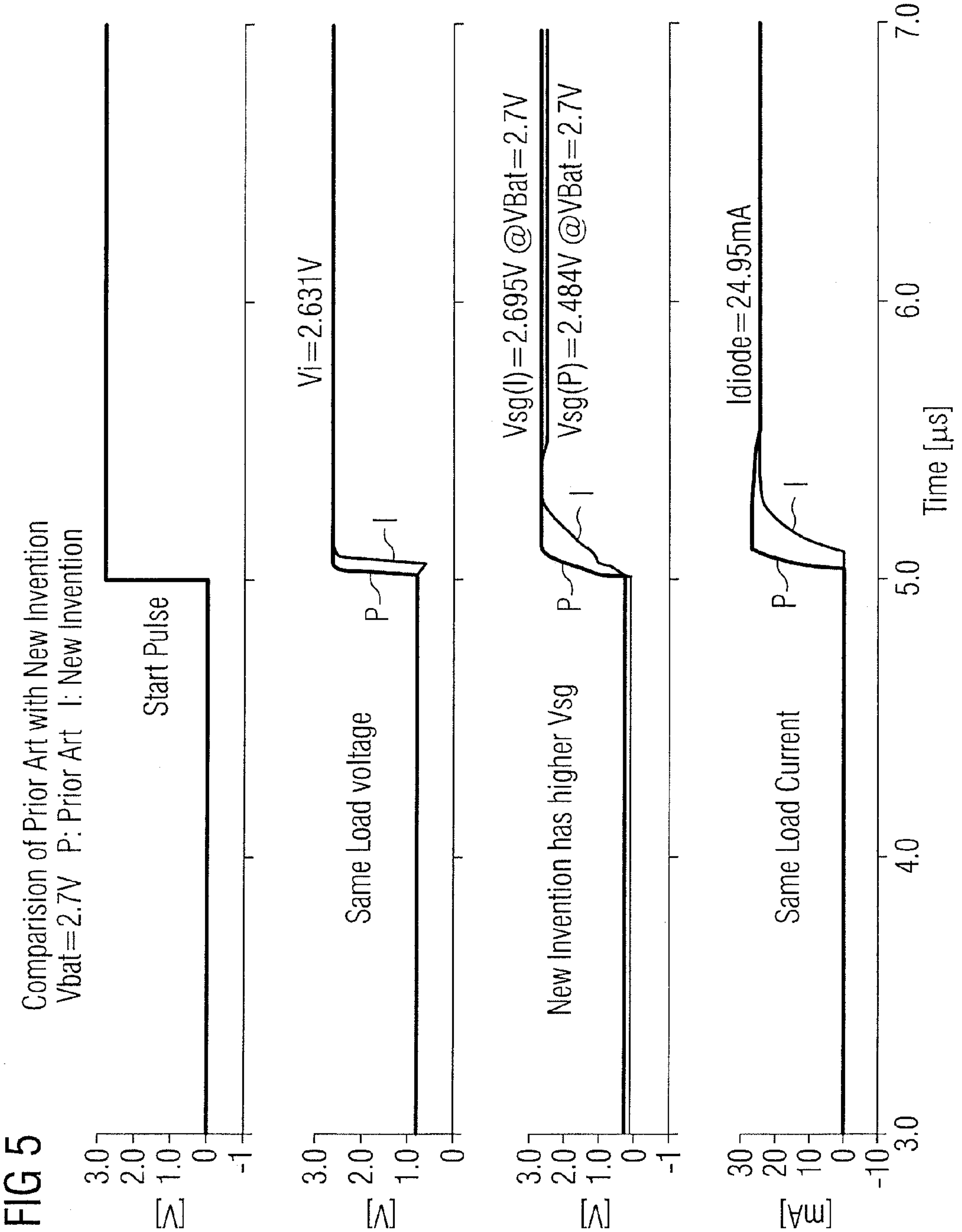
FIG. 5 shows a comparison of load voltage and current of an embodiment according to the present invention and a known current source regulator.
Figure 7:
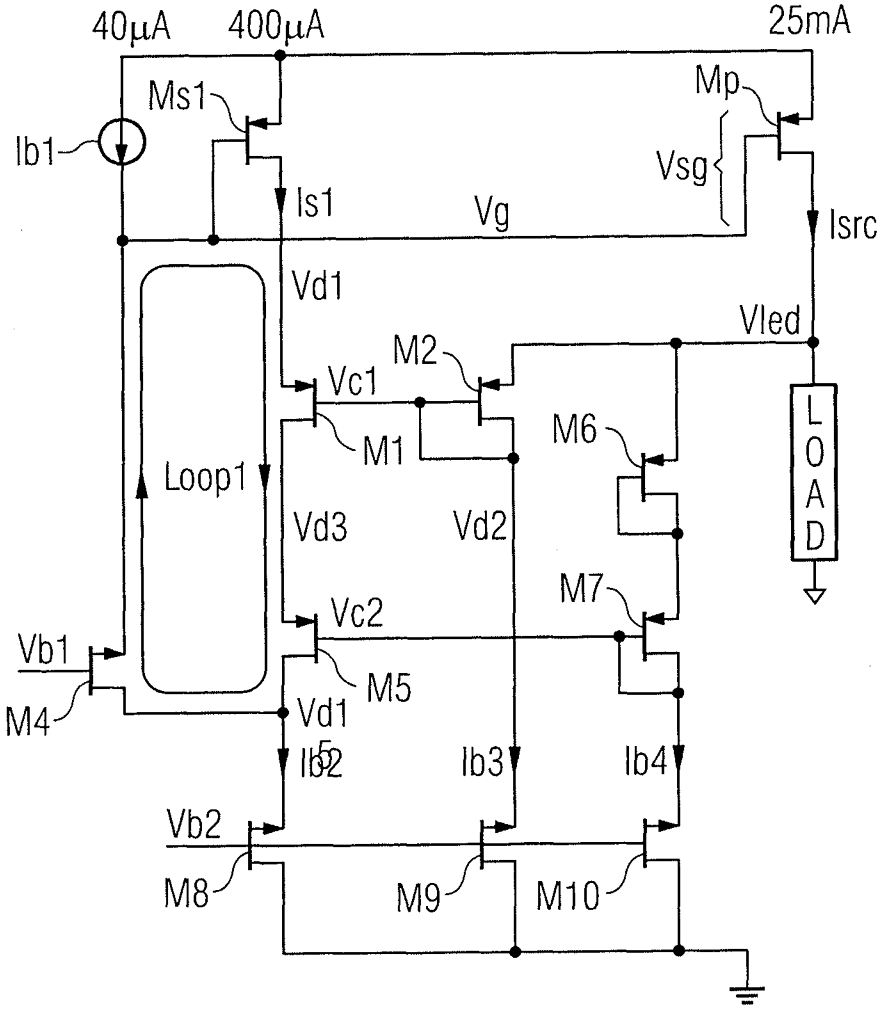
FIG. 7 shows a known current source regulator.

FIG. 5 shows a diagram comparing the current source regulator according to an embodiment of the present invention with the known current source regulator as illustrated in FIG. 7. A start pulse is given at a specific time with 5 μsec to activate the current source regulator. The second diagram illustrates the load voltage, which is almost equal for both regulators at 2.631 V.

As illustrated in the third diagram, the current source regulator according to an embodiment of the present invention (reference I) has a higher source-gate voltage Vsg of approximately Vsg(I)=2.695 V at a supply voltage Vbat=2.7 V. In contrast thereto, the known current source regulator has a loss of roughly 200 mV and comprises a source-gate voltage of Vsg(P)=2.484 V. At the same time, as illustrated in the fourth diagram, current Idiode through transistor M7 as illustrated in FIG. 3 and FIG. 4 is roughly 24.95 mA at a maximum current of 25 mA. However it can be seen, that the maximum output current is reached much faster with the proposed regulator, and no overshoot occurs.

Figure 6:
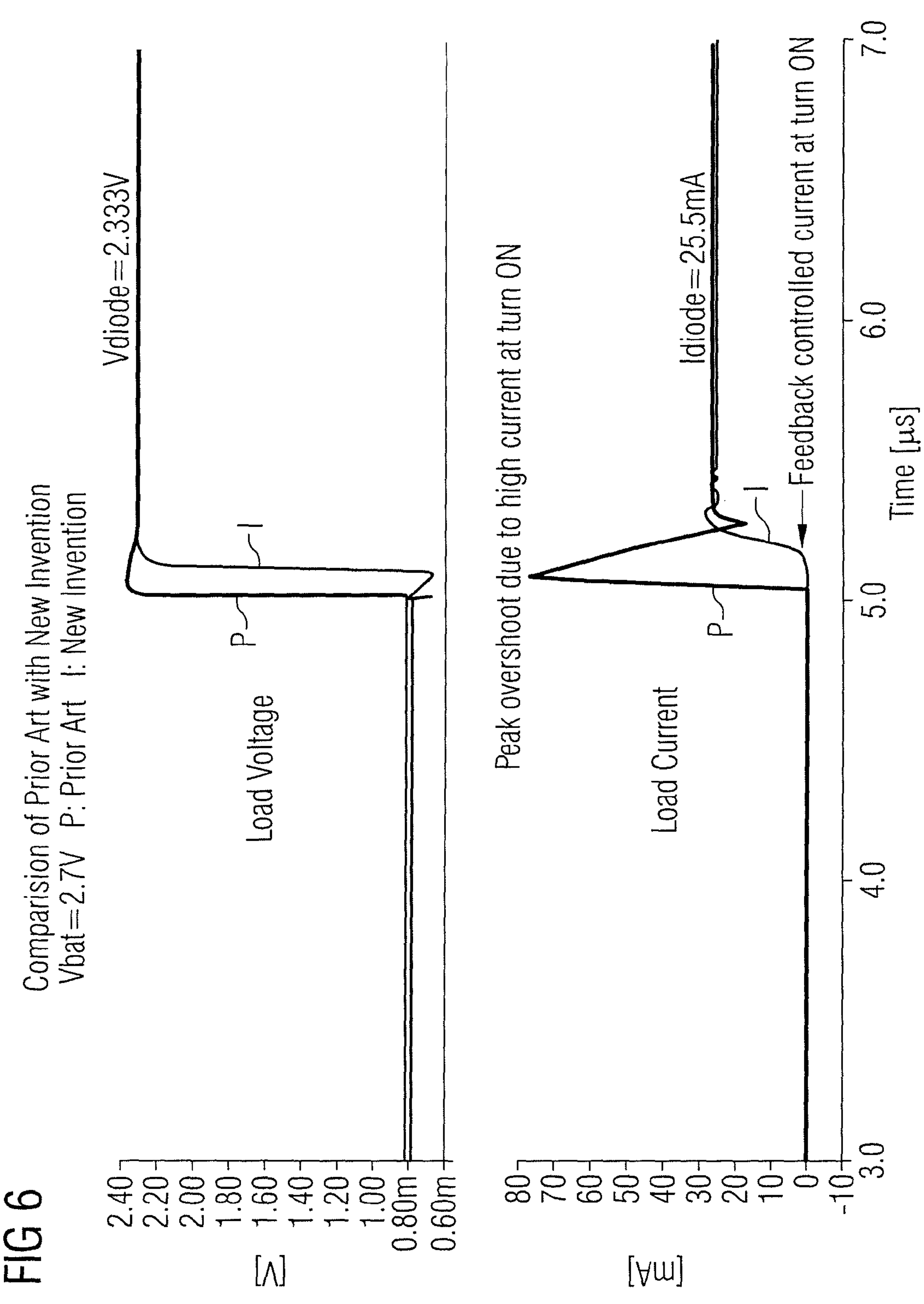
FIG. 6 shows a diagram comparing the load voltage and load current during a transient state between an embodiment of the present invention and a known current source regulator.

FIG. 6 illustrates a comparison for the peak overshoot during the startup and turn on procedure between the current source regulator according to an embodiment of the present invention and the known current source regulator according to FIG. 7. Particularly, the load current (diode, which is at steady state equal to 25.5 mA comprises a huge overshoot for the known current source regulator at startup. In contrast thereto, the overshoot for the current source regulator according to an embodiment of the present invention is much smaller. Still, in both cases the regulated output current Idiode is reached at almost the same time after 300 nsec.

The current source regulator according to the present invention can be used with a decreased size for the power transistor Mp while at the same time providing a very fast turn on in the range of 300 nsec for an output current of roughly 25 mA. A peak overshoot occurring in the known current source regulators due to the feedback loop for controlling the output current of a power transistor is prevented by an additional feedback loop providing a charging current for the source gate capacitance of the sensing transistor as well as of the power transistor.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A current source regulator for controlling an output device of a current source, the output device providing an output current to an output terminal, to which a load is connected, in response to a signal at a common node, the current source regulator comprising:

a first feedback loop to provide a first control signal to the common node, said first feedback loop having a first sensing path to provide a first sensing signal for a comparison with a first reference for generating the first control signal;

a second feedback loop having a second sensing path to provide a second sensing signal for a comparison with a second reference to generate a charging current signal, said charging current signal being applied to the common node during a transient state of the current source regulator, wherein the second feedback loop comprises a comparator assembly configured to provide the charging current signal, and wherein the charging current signal is based in part on a difference between the second reference and the second sensing signal times a constant when the second sensing signal times the constant does not exceed the second reference, and the charging current signal is zero when the second sensing signal times the constant exceeds the second reference.

2. The current source regulator according to claim 1, wherein the first feedback loop comprises a level shifter, said level shifter arranged between a comparator of the first feedback loop and the common node to which the charging current signal is applied.

3. The current source regulator according to claim 1, further comprising a voltage equalizing network having a current mirror, which is arranged in the first sensing path and the second sensing path to equalize a voltage in the first sensing path and the second sensing path to an output load voltage.

4. The current source regulator according to claim 1, wherein at least one of the first sensing path or the second sensing path comprises a sensing transistor, wherein a gate of the sensing transistor is coupled to the common node of the first and second feedback loop.

5. The current source regulator according to claim 1, wherein at least one of the first sensing signal or the second sensing signal is a current sensing signal.

6. The current source regulator according to claim 1, wherein the first sensing path, the second sensing path, and the output device are coupled to a common supply terminal.

7. The current source regulator according to claim 1, wherein the first feedback loop comprises a current path comprising a first current source and a second current source connected in series and a first node and a second node in between, wherein the first node is coupled to the first sensing path and the second node is coupled to the output device.

8. The current source regulator according to claim 7, wherein a bias device is arranged between the first and the second nodes.

9. The current source regulator according to claim 7, further comprising a third current source connected with the common node and adopted to provide a current smaller than a current of the second current source.

10. The current source regulator according to claim 9, wherein the third current source is configured to provide a current smaller than a current of the second current source.

11. The current source regulator according to claim 1, wherein the comparator assembly comprises:

a reference current source; and a differential amplifier arranged between the reference current source and a ground terminal.

12. The current source regulator according to claim 11, wherein an input transistor of the amplifier is coupled to a current mirror transistor, mirroring the second sensing current.

13. The current source regulator according to claim 11, wherein a gate of an output transistor of the amplifier is coupled to a common supply node, said node connected to the reference current source.

14. The current source regulator according to claim 1, wherein the comparator assembly comprises:

an input current mirror to mirror the second sensing signal; and an output current mirror to mirror a comparison result of a comparison of the mirrored second sensing signal and the second reference to generate the charging current signal.

15. The current source regulator according to claim 1, wherein the comparator assembly includes a reference current source providing the second reference.

16. The current source regulator according to claim 1, wherein the first and second references are fixed.

* * * * *